3,036,899
PROCESS FOR MANUFACTURING THICKENED COMBUSTIBLE MIXTURES

Albert Schnider, Ems, Graubunden, Switzerland, assignor to Inventa A.G. für Forschung und Patentverwertung, Zurich, Switzerland
No Drawing. Filed Apr. 2, 1957, Ser. No. 650,102
4 Claims. (Cl. 44—7)

The present invention relates to thickened combustible mixtures and process for manufacturing the same.

This is a continuation-in-part of my copending application Ser. No. 352,050, filed April 29, 1953, and now abandoned.

It is known that a thickened combustible material, which is suitable for covering large surfaces with fire, can be obtained by stirring so-called napalm powder (which is a mixture of aluminum soaps of coconut fatty acid, naphthenic acid, oleic or linoleic acid in definite proportions) in benzine with the addition, in some cases, of peptizing agents.

These napalm gels, however, have certain disadvantages. On the one hand, the time of burning is relatively short; on the other hand, the bottom effect is unsatisfactory because these gels burn with a high flame and form a resinous residue which protects the underlying surface to a certain extent from the action of the heat.

Another disadvantage is that these gels are hygroscopic. Their behavior towards water is similar to that of paper or gelatine. The water taken up has a considerable effect on the consistency of the gel formed, since it probably prevents chain formation of the aluminum soap molecules, or splits up the chains formed. Moreover, the known gels are sensitive to oxidation and changes in pH, as well as towards some metals, and certain organic substances such as alcohols, amines, anti-rust agents, etc. The instability of the gels causes changes in the viscosity and reduces the plasticity or even causes separation of the constituents. A further disadvantage of the known napalm gels is that the freshly prepared mixtures of napalm with benzine cannot be used at once, but must be allowed to ripen by ageing.

It has also been proposed to admix soaps to incendiary oil mixtures to form wax-like solidified oil compositions. Metal salts of hydrogenated fish oil acids were used for this purpose, but such oil mixtures become granular and crumbly at low temperatures.

Further it is known to add raw rubber to incendiary oils, but these mixtures too become rapidly frozen and cannot be used in incendiary bombs. By admixing isobutylene polymers of molecular weights above 30,000 to inflammable naphtha, improved thickened combustible mixtures have been obtained. Other combustible substances such as powdered coal and tar may also be added to these mixtures.

However, the manufacture of the known mixtures containing natural or synthetic soft rubber and liquid hydrocarbons is very cumbersome due to the tackiness of the rubber. Large amounts of rubber are difficult to handle and, when admixed to fuels, form lumps and are not readily soluble. Also, the storing and the availability of definite amounts of rubber presents many difficulties which arise from the high viscosity and the tackiness of soft rubber.

It is an object of this invention to overcome these difficulties by bringing soft rubber in to a readily avialable granular and non-tacky form, so that it can be handled and resolved in liquid fuels easily.

Another object of the invention is the manufacture of an improved thickened combustible in liquid or gel form by adding granulated non-tacky soft rubber to liqiud fuels.

A further object of the invention is the manufacture of thickened combustible liquids containing additional ingredients regulating the viscosity, the bottom—or top—heat while burning, and the time of burning of said liquids.

A still further object of the invention are thickened combustible liquids or gels prepared according to the processes described below and as defined in the examples hereinafter.

Other objects will appear in the following description and examples.

According to the invention, the first step in the manufacture of a thickened combustible liquid consists of preparing a granular powder of an isobutylene polymer of a molecular weight of 50,000 to 250,000 (know under the registered trademark "Oppanol B"), which is a tacky soft synthetic rubber. The soft rubber is mechanically disintegrated in the absence of water together with a so-called separator. This separator or separating substance may consist e.g. of metal salts of higher fatty acids; metal salts of naphthenic acids, pulverized naphthalene, stearine, paraffin, derivatives of montan wax, finely pulverized silica gel, or magnesia, or of mixtures of these substances. According to the invention, the amount of separators to be used is up to 50%, calculated on the weight of the total quantity of powder.

The soft rubber is disintegrated into small particles preferably by grinding with emery stone or grinding in a ball mill. The particles are mixed continuously or in batches with the separator in powdery form. Care must be taken to effect the mixing immediately after having disintegrated the soft rubber. The mixing may be done by any suitable mixing machine known in the art, such as, e.g., in ball mills. In this way it is possible to convert the disintegrated soft rubber to a powder, the particles of which no longer stick together.

It is an important factor that the organic separators used may also have thickening properties and produce with the soft rubber and the organic liquid a homogeneous, stable, combustible gel. The inorganic separators are preferably used to improve the storability of the granulated soft rubber.

As combustible liquid, I use a mixture of saturated or unsaturated hydrocarbons, aliphatic or hydroaromatic alcohol such as, for example, hydrogenation products of lignin, which are obtained e.g. according to British Patent 756,283. Other combustible liquids which may be used and which also increase the viscosity of the mixture are benzene and tar oils, which may also contain a small proportion of alcohols or esters.

An increase in the bottom heat or the surface heat of the burning mixture is obtained by the addition of perchlorates, which cause the combustion to become substantially complete. Alkali metal perchlorates increases the top heat. By means of these additions the result is obtained that, as compared to napalm mixtures, the organic substance burns away practically completely.

It is possible to obtain a longer time of burning by increasing the viscosity of the thickened combustible mixture. For this purpose, either the amount of soft rubber or separator may be increased, however the latter has always to be present in sufficient quantities to effect separation of the soft rubber particles in or after the grinding operation.

Another possibility to increase the viscosity of the liquid fuel (and hence the burning time) consists in admixing xanthates to it. As xanthates there may be used, for example, isoamylxanthate, tetrahydro-furfuryl xanthate, octyl xanthate, lauryl xanthate, oleyl xanthate etc., or mixtures of these xanthates. The xanthates used, in which elementary sulphur may be dissolved, may be added in an amount up to 70% by weight of the total mixture. It was not to be expected that xanthates could be added to the combustible preparations above described, since they are not compatible with the before-mentioned napalm gels.

By this means the viscosity can be increased, but often it is desirable to shorten the burning time of highly viscous mixtures. In this case the above mentioned perchlorates may be added, which counteract the xanthates in respect of the burning time. The effect of the perchlorates can be increased by the addition of powders of light metals, particularly of aluminum, which may be added in an amount up to about 5% of the perchlorate. By this means it is possible to regulate the time of burning, the viscosity and the bottom or top heat. The xanthate can be treated with ligin powder before being added.

All operations to obtain a thickened combustible mixture according to the invention are preferably carried out at room temperature, i.e. at about 10–30° C.

The invention will now be illustrated in a number of examples, but it should be understood that these are given by way of illustration and not of limitation and that many modifications can be made without departing from the scope of the invention.

All parts are by weight.

Example 1

1,800 parts of a soft rubber (polyisobutylene with a molecular weight of 50,000–250,000) are charged to an emery grinding machine and are stirred with 200 parts of very finely pulverized aluminum palmitate at room temperature.

550 parts of light benzine are mixed with 200 parts of refined petroleum, and 50 parts of the prepared soft rubber powder mixture are stirred in at room temperature in the absence of water. After stirring for about half an hour, there is obtained a very stable product which is ready for use. As compared to napalm gel, this gel is insensitive to water, electrolytes, etc., and does not require to be subjected to a period of ageing in order to acquire the necessary viscosity.

The time of burning is about 100% longer than that of napalm gel; 100 grams burn for 10 minutes on a flat iron plate of 15 cm. diameter, whereas with napalm gel the burning time is only about 4 minutes. The unburned resinous residue from two grams amounts to only about one-third of the residue when napalm gel is burnt under similar conditions.

Example 2

With 90 parts of the thickened combustible material made in accordance with Example 1, I mix 3 parts of tetrahydrofurfurylxanthate and 7 parts of finely powdered ammonium perchlorate which have been stirred together before use at room temperature. The combustion of this mixture is more intense and a higher temperature is developed than with the mixture of Example 1, and practically no residue remains behind. The residue is about 0.5 g. from 100 g.; with napalm, on the other hand, the residue from 100 g. amounts to about 3 g. The time of burning is the same as with napalm, but the top heat is greater.

Example 3

Into the combustible material made in accordance with Example 1 are stirred, at room temperature, 10% of potassium isoamyl xanthate powder and thereafter, a short time before use, 5% of ammonium perchlorate, all calculated on the weight of the whole mixture. The time of burning of 100 g. on a flat iron plate of 15 cm. diameter is 6 minutes, i.e. 30–40% longer than with napalm. The product when burning flows down an inclined surface less quickly than napalm.

Example 4

4,700 parts of soft rubber (as defined in Example 1) are charged to a ball mill and 300 parts of very finely powdered naphthalene, containing 10% aluminum soap of coconut fatty acid, are gradually added at room temperature.

400 parts of benzine, 200 parts of refined petroleum, 50 parts of benzene, and 100 parts of neutral lignin hydrogenation product (obtained according to British Patent 756,283 by treatment of lignin-containing material with copper-chromium oxide at temperatures above 350° C. and pressures above 350 atm.) are stirred for one hour at room temperature with 60 parts of the above mentioned soft rubber powder. To 80 parts of this product are added 10 parts of xanthate in viscous form (tetrahydrofurfuryl- and oleyl xanthate (1:1) containing 20% of petroleum/fusel oil and 25% of dissolved sulphur), whereafter 10 parts of dehydrated powdered sodium perchlorate containing 2% aluminum powder are stirred in. The time of burning of this mixture is about 20% longer than that of the napalm gel, and the bottom heat is more intense. Also a flash flame is produced.

Example 5

5,700 parts of soft rubber (as defined above) are charged to a disintegrating machine and mixed batchwise at room temperature with 1000 parts of finely pulverized stearine (melting range 69–71° C.) and 1100 parts of pulverized paraffin (melting range about 75–90° C.). Stearine and paraffin are added in batches of about 100 parts. A granular nontacky powder is obtained. 600 parts of this powder are introduced into 700 parts of light benzine and stirred for half an hour. The product burns for at least 20% longer than the napalm gel.

Example 6

1000 parts of soft rubber (as defined in Example 1) are charged to a disintegrating machine and intimately mixed at room temperature with 35 parts of silica aerogel in the absence of water. The silica aerogel is a fine powder of silica with a particle size of about 1–3$\mu$ and a bulk weight of about 0.033 g./cm.$^3$. By using silica aerogel as a separator, a noncaking powder of soft rubber with improved storability is obtained, i.e. the powder can be stored at room temperature or below without chemical decomposition or caking for at least two years.

Example 7

The process of Example 6 can be improved as follows: 1000 parts of soft rubber (as defined in Example 1) are charged to a disintegrating machine and intimately mixed at room temperature with 10 parts of finely powdered magnesia in the absence of water. After this pretreatment 30 parts of silica aerogel (as defined in Example 6) are added and intimately mixed at room temperature with the soft rubber particles containing already magnesia. The soft rubber granules obtained by this method are storable at room temperature or below without chemical decomposition or caking for at least three years.

The magnesia used for the pretreatment can be replaced by finely powdered aluminum naphthenate (containing 7% by weight of trivalent aluminum ions). The storability of the soft rubber granules is not changed substantially, but granules containing aluminum naphthenate instead of magnesia will give, together with liquid fuels, burning mixtures which are more viscous.

Example 8

The storage of the nontacky soft-rubber granules obtained according to Examples 6 and 7 is advantageously effected as follows: Drums of a capacity of about 50 liters and a height of about 50 cm. are first filled up to about one-third of their height with a layer of soft rubber granules containing about 4–5% by weight of silica aerogel (eventually containing also about 1% by weight of magnesia as described in Example 7). On this first layer there is placed a second layer up to about two-thirds of the drum's height, the second layer consisting of soft-rubber granules containing about 2–3% by weight of silica aerogel (eventually also containing about 1% by weight of magnesia as described in Example 7). Finally the drum is filled up with a third layer of soft rubber granules containing about 1–2% by weight of silica aerogel (eventually also about 0.5% by weight of magnesia as described in Example 7). This method of storing together soft rubber granules containing from bottom to top a decreasing amount of separator will give a considerable saving of the latter.

The soft rubber particles obtained according to Examples 6 and 7 may be added to liquid fuels as described in the foregoing examples, e.g. 500 parts of the powder obtained according to Example 7 are added to 800 parts of light petroleum, whereby a thickened combustible mixture is obtained which burns at least 60% longer than a napalm gel.

What I claim is:

1. A process for the preparation of a homogeneous and stable combustible mixture, ready to use, non-hydroscopic, of low ash content and of improved burning time, which comprises grinding into a disintegrated polyisobutylene compound having a molecular weight of 50,000 to 250,000 five to 50 percent by weight of an antitack agent selected from the group consisting of metal salts of fatty acids, metal salts of naphthenic acids, powdered naphthalene, stearine, paraffin wax, powdered silica, powdered magnesia, and mixtures thereof; gelling a liquid hydrocarbon fuel by stirring up to 15 percent by weight of the mixture thus obtained into said hydrocarbon for 30 to 60 minutes at room temperature; and grinding into the combustible thereby obtained a xanthate selected from the group consisting of isoamyl xanthate, lauryl xanthate, octyl xanthate, oleyl xanthate, tetrahydrofurfuryl xanthate, and a mixture of these xanthates, said xanthate amounting to up to substantially 20 percent by weight of said combustible.

2. A process for the preparation of a homogeneous and stable combustible mixture, ready to use, non-hydroscopic, of low ash content, which comprises grinding into a disintegrated polyisobutylene having a molecular weight of 50,000 to 250,000 five to 50 percent by weight of an antitack agent selected from the group consisting of metal salts of fatty acids, metal salts of naphthenic acids, powdered naphthalene, stearine, paraffin wax, powdered silica, powdered magnesia, and mixtures thereof; gelling a liquid hydrocarbon fuel therewith by stirring up to 15 percent by weight of the mixture thus obtained into said hydrocarbon fuel for 30 to 60 minutes at room temperature; grinding into said gelled hydrocarbon fuel a xanthate selected from the group consisting of isoamyl xanthate, lauryl xanthate, octyl xanthate, oleyl xanthate, tetrahydrofurfuryl xanthate, and a mixture of these xanthates, said xanthate amounting to up to substantially 20 percent by weight of said gelled fuel; and also grinding into said fuel up to 15 percent of an alkali perchlorate, calculated on the total combustible mixture, at room temperature.

3. A process for preparing a thickened combustible mixture according to claim 2, wherein the perchlorate added is sodium perchlorate for increasing the bottom heat of the combustible mixture while burning.

4. A process for preparing a thickened combustible mixture according to claim 2, wherein the perchlorate added is ammonium perchlorate for increasing the top heat of the combustible mixture while burning.

References Cited in the file of this patent

UNITED STATES PATENTS

| | | |
|---|---|---|
| 2,120,549 | Dike | June 14, 1938 |
| 2,368,522 | Cornell et al. | Jan. 30, 1945 |
| 2,388,984 | Mack | Nov. 13, 1945 |
| 2,445,311 | Cooke et al. | July 20, 1948 |
| 2,445,312 | Cooke et al. | July 20, 1948 |
| 2,478,718 | Singleton | Aug. 9, 1949 |
| 2,530,493 | Van Loenen | Nov. 21, 1950 |
| 2,570,990 | Southern et al. | Oct. 9, 1951 |
| 2,668,098 | Alm | Feb. 2, 1954 |
| 2,769,697 | Goldenson et al. | Nov. 6, 1956 |

FOREIGN PATENTS

| | | |
|---|---|---|
| 586,130 | Great Britain | Mar. 7, 1947 |

OTHER REFERENCES

"Use of Aluminum Soaps and Other Fuel Thickeners in Gelling Gasolines," article by Rueggerberg, J. of Physics and Colloid Chemistry, vol. 52, 1948, pp. 1444–1459.

"Fire From the Air," booklet by Zanetti, Columbia University Press, N.Y., 1942, 54 pages.

"Compounding Ingredients for Rubber," Sec. Ed., India Rubber World, Bill Brothers Pub. Corp., 1947, pp. 213, 383–389 and 397.